(12) United States Patent
Candage et al.

(10) Patent No.: US 8,816,661 B2
(45) Date of Patent: Aug. 26, 2014

(54) HYBRID ANALOG/DIGITAL POWER SUPPLY CIRCUIT INCLUDING ANALOG SUMMER CIRCUIT TO PRODUCE AN ERROR VOLTAGE

(75) Inventors: Anthony B. Candage, Center Harbor, NH (US); Venkat Sreenivas, Winchester, MA (US); Gary D. Martin, Boxford, MA (US); Robert T. Carroll, Andover, MA (US)

(73) Assignee: International Rectifier Corporation, El Segundo, CA (US)

( * ) Notice: Subject to any disclaimer, the term of this patent is extended or adjusted under 35 U.S.C. 154(b) by 1077 days.

(21) Appl. No.: 12/417,477

(22) Filed: Apr. 2, 2009

(65) Prior Publication Data

US 2010/0188062 A1    Jul. 29, 2010

Related U.S. Application Data

(60) Provisional application No. 61/147,834, filed on Jan. 28, 2009.

(51) Int. Cl.
*G05F 1/00* (2006.01)
*H02M 3/158* (2006.01)
*H02M 3/157* (2006.01)
*H03M 1/12* (2006.01)
*H03M 1/34* (2006.01)

(52) U.S. Cl.
CPC ............ *H02M 3/157* (2013.01); *H02M 3/1588* (2013.01); *Y02B 70/1466* (2013.01)
USPC ........... 323/283; 323/282; 323/271; 341/155; 341/158

(58) Field of Classification Search
USPC .......................... 323/282–285; 341/155, 158
See application file for complete search history.

(56) References Cited

U.S. PATENT DOCUMENTS

| 5,856,800 | A  | * | 1/1999  | Le Pailleur et al. | 341/159 |
|-----------|----|---|---------|--------------------|---------|
| 7,180,439 | B1 | * | 2/2007  | Bakker             | 341/155 |
| 2002/0163390 | A1 | * | 11/2002 | Richardson     | 331/17  |
| 2006/0055388 | A1 | * | 3/2006  | Tang et al.    | 323/284 |
| 2007/0182391 | A1 | * | 8/2007  | Chapuis et al. | 323/282 |
| 2008/0012742 | A1 | * | 1/2008  | Wu et al.      | 341/155 |
| 2008/0205307 | A1 | * | 8/2008  | Vandewiele et al. | 370/297 |

* cited by examiner

*Primary Examiner* — Adolf Berhane
*Assistant Examiner* — Henry Lee, III
(74) *Attorney, Agent, or Firm* — Chapin IP Law, LLC

(57) ABSTRACT

According to example configurations as described herein, a power supply system includes a unique circuit including an analog summer circuit, an analog-to-digital converter, and a digital controller. An output voltage feedback control loop of the power supply system feeds back the output voltage to the analog summer circuit. The analog summer circuit generates an analog error voltage signal based on: i) the output voltage received from the output voltage feedback loop, ii) an analog reference voltage signal, and iii) an analog reference voltage adjustment signal. The analog reference voltage adjustment signal varies depending on a magnitude of current provided by the output voltage to the dynamic load. Accordingly, the analog summer circuit can be configured to support adaptive voltage positioning. The analog-to-digital converter converts the analog error voltage signal into a digital error voltage signal. A controller generates output voltage control signal(s) based on the digital error voltage signal.

27 Claims, 11 Drawing Sheets

HYBRID ANALOG/DIGITAL POWER SUPPLY CIRCUIT INCLUDING ANALOG SUMMER CIRCUIT TO PRODUCE AN ERROR VOLTAGE

RELATED APPLICATIONS

This application is related to and claims the benefit of earlier filed U.S. Provisional Patent Application Ser. No. 61/147,834 entitled "Multiphase VR Controller with Wideband AVP," filed on Jan. 28, 2009, the entire teachings of which are incorporated herein by this reference.

BACKGROUND

Adaptive voltage positioning (sometimes referred to as AVP) has been implemented in power supply circuitry to provide better transient response and reduce the number of output filter capacitors. For example, adaptive voltage positioning includes modifying an operating setpoint of a power supply such that the output voltage is higher than a nominal value during conditions in which the current supplied to the load is relatively low. The output voltage of the power supply is controlled to be lower than the nominal value during conditions in which the current supplied to the load is relatively high. Accordingly, the output voltage of a power supply implementing adaptive voltage positioning varies depending on the amount of current consumed by the dynamic load.

To implement adaptive voltage positioning, the vast majority of conventional power supply control circuits use a standard analog control loop. Such control loops typically include an analog buffer amplifier, analog error amplifier (which acts as the control loop filter with external compensation components), a ramp generator (per phase), and a comparator (per phase). Other analog components have been used in the prior art to implement phase balancing and fault detection.

FIG. 1 is an example diagram illustrating a summer circuit 100 for controlling the output of a power supply according to the prior art. As shown, the summer circuit 100 includes both analog components and digital components. The circuit includes multiple analog-to-digital converters.

FIG. 2 is an example diagram illustrating a hypothetical output impedance of the power supply circuit in FIG. 1. As shown, the DC output impedance for the power supply circuit 100 is non-linear due to the errors present in the analog-to-digital converters 101 and 102 of FIG. 1.

BRIEF DESCRIPTION

Conventional power supply circuits such as those as discussed above can suffer from a number of deficiencies. For example, as mentioned above, the DC output impedance of a power supply circuit can vary in a non-linear manner as shown in FIG. 2 due to errors in the analog-to-digital converters 101 and 102. The (non-linear) variation of the output impedance over the current consumption range (as in FIG. 2) is undesirable.

Embodiments herein deviate with respect to the conventional applications as discussed above. For example, embodiments herein are directed to a unique partitioning of respective analog and digital components of a power supply feedback circuit.

More specifically, one embodiment herein includes a power supply system for producing an output voltage to power a dynamic load. The power supply system can include an analog summer circuit, analog-to-digital converter, and a digital controller. An output voltage feedback control loop of the power supply circuit feeds back the output voltage to the analog summer circuit. The analog summer circuit can be configured to generate an analog error voltage signal based on: i) the output voltage received from the output voltage feedback loop, ii) an analog reference voltage signal, and iii) an analog reference voltage adjustment signal.

In one embodiment, the analog summer circuit supports adaptive voltage positioning. For example, the analog voltage reference signal is adjusted (based on the analog reference voltage adjustment signal) to produce an operating setpoint value. The analog reference voltage adjustment signal varies depending on the amount of current consumed by the load. Thus, the operating setpoint value varies depending on an amount of current consumed by the dynamic load.

The analog error voltage signal produced by the analog summer circuit is indicative of how close a magnitude of the output voltage is to the operating setpoint. As mentioned above, the operating setpoint is based on a combination of the analog reference voltage signal and the analog reference voltage adjustment signal.

In one embodiment, the analog-to-digital converter is disposed in the output voltage feedback loop such that the analog-to-digital converter is configured to convert the analog error voltage signal (as produced by the analog summer circuit) into a digital error voltage signal.

A digital controller receives the digital error voltage signal from the analog-to-digital converter. Based on the digital error voltage signal, the digital controller generates one or more control signals to drive a respective power supply switching phase of the system to increase or decrease the output voltage depending on the digital error voltage signal.

The prior art includes a number of different "all" analog controllers (in which the entire control circuit and related components are analog) are not flexible, susceptible to component aging, and can have lower yield due to the inherent mismatches in the analog circuits.

Prior art in digital controllers uses a low bandwidth digital scheme for implementing adaptive voltage positioning functions. Such functions are deficient because they cannot provide the required bandwidth needed to implement adaptive voltage positioning. Use of an "all" digital approach (e.g., in which the entire adaptive voltage position waveform is digitized) places stringent linearity requirements on the analog-to-digital converter which can negate the improvement in product cost possible with digital control. Prior art in digital controllers also use low sampling rates (such as less than 10 MHz), which do not allow the implementation of complex digital non-linear transient control schemes. To overcome this, prior art uses analog circuits (to complement a respective digital feedback control) for implementation of transient circuits.

In one embodiment as described herein, a unique hybrid analog/digital architecture includes wideband analog current feedback (such as at least 1 MHz and is not band limited by sampling rate) coupled with high speed sampling of the error voltage (at least 50 MHz). The high speed fixed error sampling rate (which is not dependent on phase switching frequency) enables advanced digital algorithms to measure slope and magnitude of the voltage error to a fine resolution (such as >=7 bits). The fixed sampling rate also allows the digital logic to be optimized for low gate count.

Embodiments herein can include a second low-speed ADC used to digitize low bandwidth signals that are used for fault sensing and monitoring such as total current, individual phase currents, input voltage, and temperature. The low-speed ADC can be a low power, high resolution, converter such as a successive approximation or sigma-delta converter.

For applications requiring multiple voltage control loops, the high-speed error digitizer according to embodiments herein can be multiplexed to digitize two or more error voltages. The digital feedback loop may require a minimal increase in complexity to support multiplexed voltage loops as digital filters can easily be reused with the addition of registers to store intermediate values. Thus, the proposed digital architecture is highly extensible.

These and other more specific embodiments are disclosed below.

The analog/digital interface supporting adaptive voltage positioning according to embodiments herein is advantageous over conventional techniques. For example, the interface can include fewer complex analog-to-digital converter components than an amount used in conventional methods. Additionally, the analog/digital interface circuit as described herein provides a more constant output impedance over a range of current than do conventional techniques.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed above, techniques herein are well suited for use in switching power supply applications such as those implementing adaptive voltage positioning. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example configurations as described herein, a power supply system produces an output voltage to power a dynamic load. The power supply system includes a unique circuit including an analog summer circuit, an analog-to-digital converter, and a digital controller. An output voltage feedback loop of the power supply circuit feeds back the output voltage to the analog summer circuit. The analog summer circuit generates an analog error voltage signal based on: i) the output voltage received from the output voltage feedback loop, ii) an analog reference voltage signal, and iii) an analog reference voltage adjustment signal. The analog reference voltage adjustment signal can vary depending on a magnitude of current provided by the output voltage to the dynamic load. Accordingly, the analog summer circuit can be configured to support adaptive voltage positioning.

The analog voltage reference signal can be adjusted (based on the analog reference voltage adjustment signal) to produce an operating setpoint value of the power supply. As mentioned, the analog reference voltage adjustment signal varies depending on the amount of current consumed by the load. Thus, the operating setpoint value (and therefore a magnitude of the output voltage) varies depending on an amount of current consumed by the dynamic load.

Figure 1:
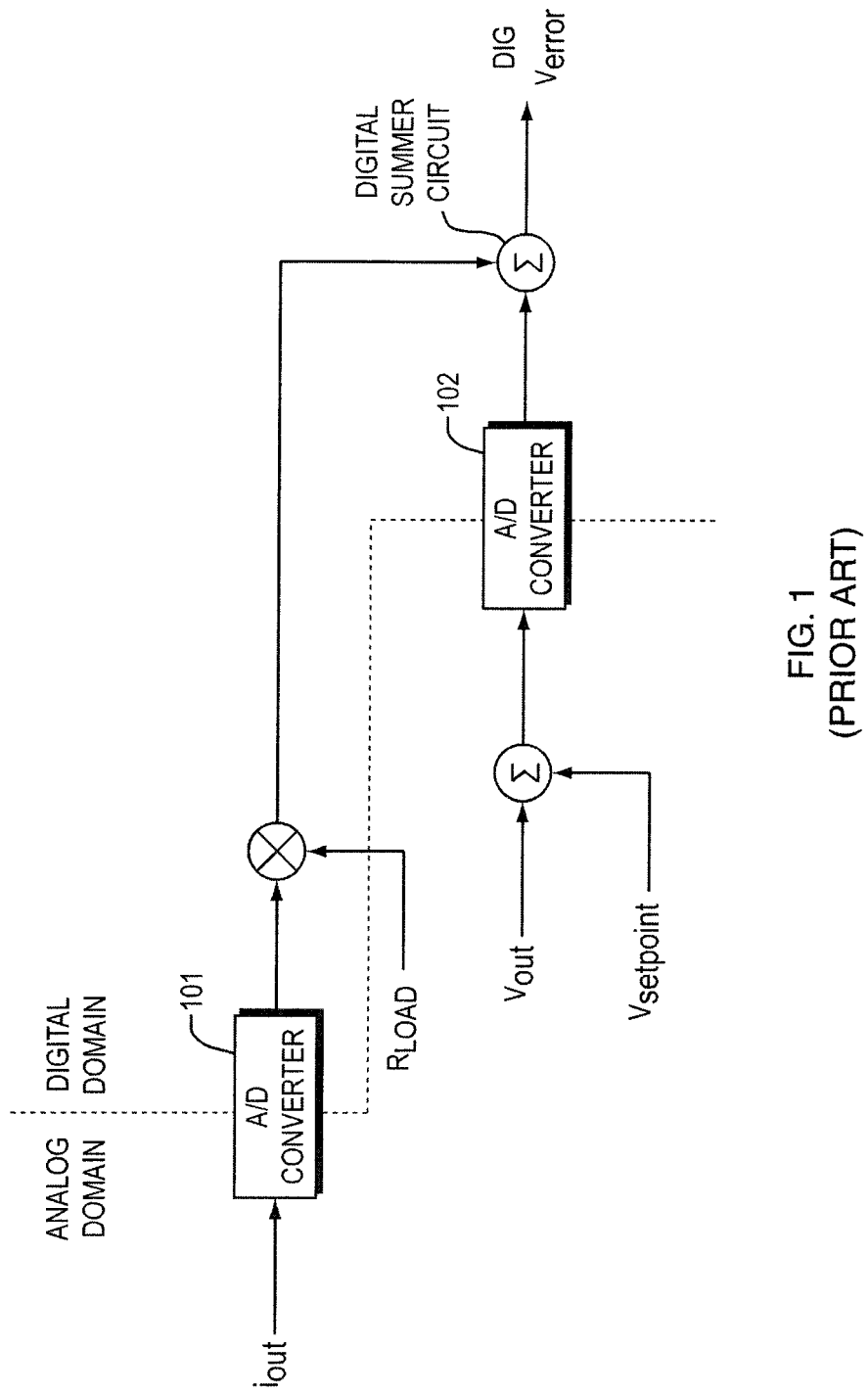
FIG. 1 is an example diagram of a power supply summer circuit according to the prior art.
Figure 2:
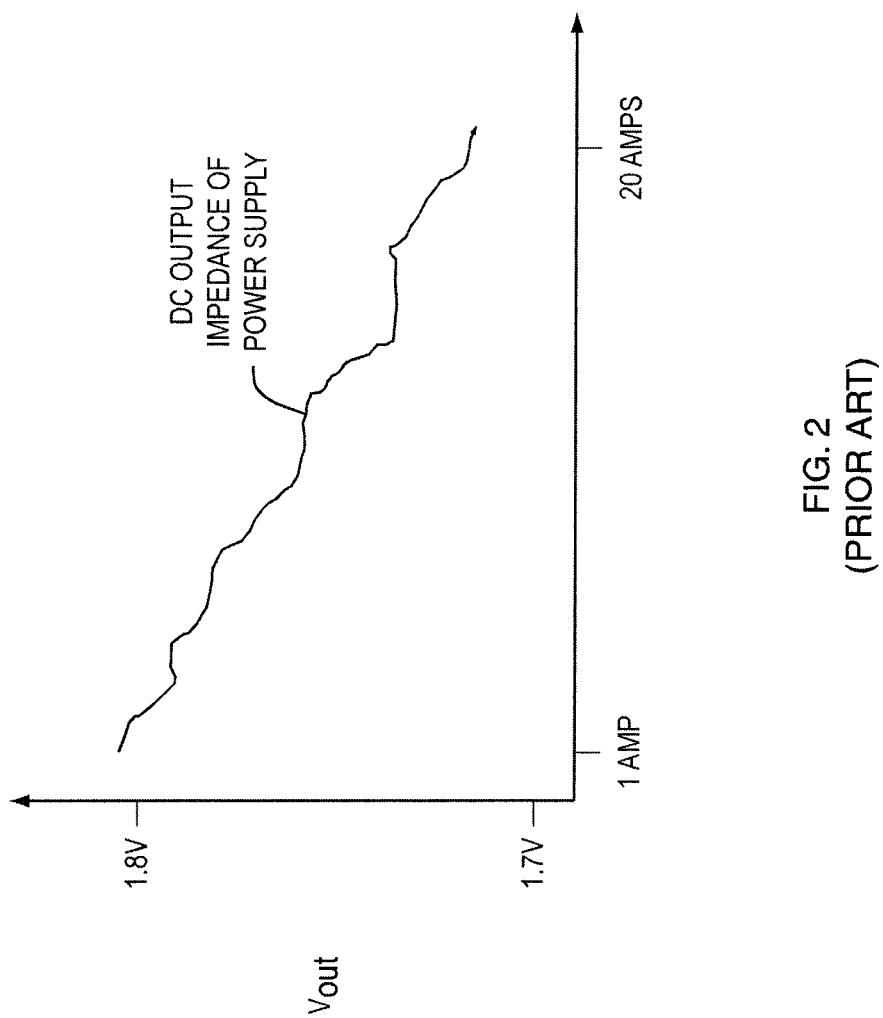
FIG. 2 is an example diagram illustrating a hypothetical output impedance according to the prior art).
Figure 3:
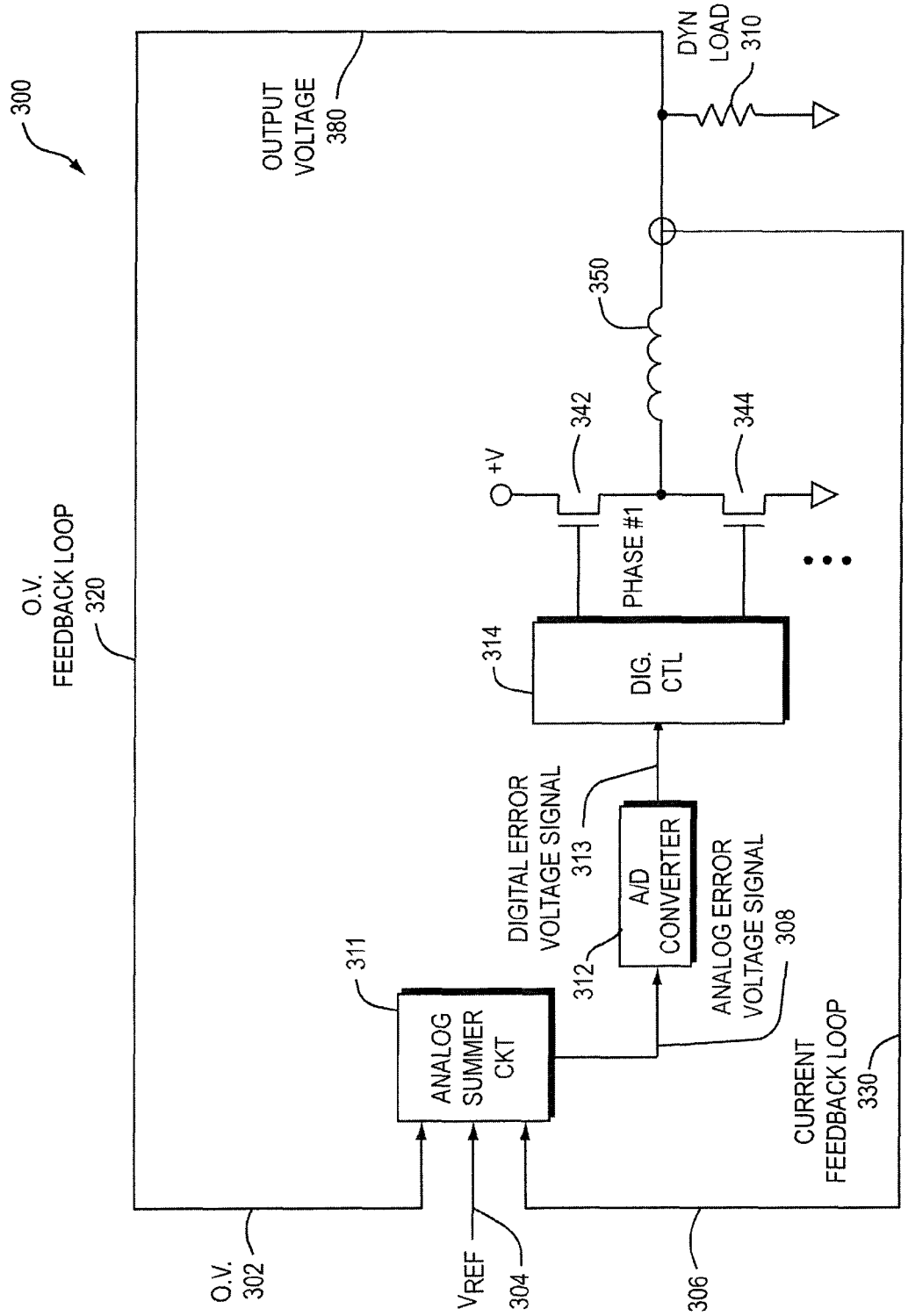
FIG. 3 is an example diagram of a power supply switching circuit according to embodiments herein.

Now, more specifically, FIG. 3 is an example diagram of a power supply system 300 according to embodiments herein. As shown, power supply system 300 includes an output voltage feedback loop 320, current feedback loop 330, analog summer circuit 311, analog-to-digital converter 312, digital controller 314, high side switch 342, low side switch 344, energy storage device 350, and dynamic load 310.

During operation, analog summer circuit 311 receives an analog signal 302 from output voltage feedback loop 320. The analog signal 302 is indicative of a magnitude of the output voltage 380 that is used to provide power to dynamic load 310. The analog summer circuit 311 also receives analog signal 306 from the current feedback loop 330. The analog signal 306 is indicative of an amount current supplied to the dynamic load 310 via the output voltage 380. The analog summer circuit 311 receives an analog reference voltage signal 304. In one embodiment, the analog reference voltage signal 304 is a fixed reference voltage value.

Based on inputs (e.g., analog signal 302, analog signal 304, and analog signal 306), the analog summer circuit 311 generates an analog error voltage signal 308 based at least in part on a difference between the analog signal 302 and the analog reference voltage signal 304.

In one embodiment, the power supply system 300 implements adaptive voltage positioning to produce output voltage 380. In such an embodiment, the analog summer circuit 311 adjusts the analog error voltage signal 308 based at least in part on a magnitude of the analog signal 306.

Analog-to-digital converter 312 receives the analog error voltage signal 308 generated by the analog summer circuit 311. The analog-to-digital converter 312 converts the analog error voltage signal 308 into digital error voltage signal 313.

The analog-to-digital converter 312 outputs the digital error voltage signal 313 to digital controller 314. In one embodiment, the digital controller 314 is configured to generate at least one pulse width modulation signal for driving high side switch 342 and low side switch 344 of power supply system 300.

As is known in the art, when the high side switch is turned ON, the low side switch 344 is turned OFF. In general, when the high side switch is turned OFF, the low side switch 344 is turned ON.

Based on switching of the high side switch 342 and the low side switch 344, the digital controller 314 controls the magnitude of the output voltage 380. For example, to increase the output voltage 380 (if a magnitude of the output voltage happens to be below a desired operating setpoint as identified by the digital error voltage signal 313), the digital controller 314 activates the high side switch 342 for a longer duration during a pulse width modulation cycle. Conversely, to decrease the output voltage 380 (if a magnitude of the output voltage happens to be above a preferred operating setpoint as identified by the digital error voltage signal 313), the digital controller 314 activates the high side switch 342 for a shorter duration during a pulse width modulation cycle.

The power supply system 300 can include a single phase (e.g., a phase including high side switch 342, low side switch 344, storage device 350, etc.) or multiple phases in parallel in which to generate output voltage 380.

Figure 4A:
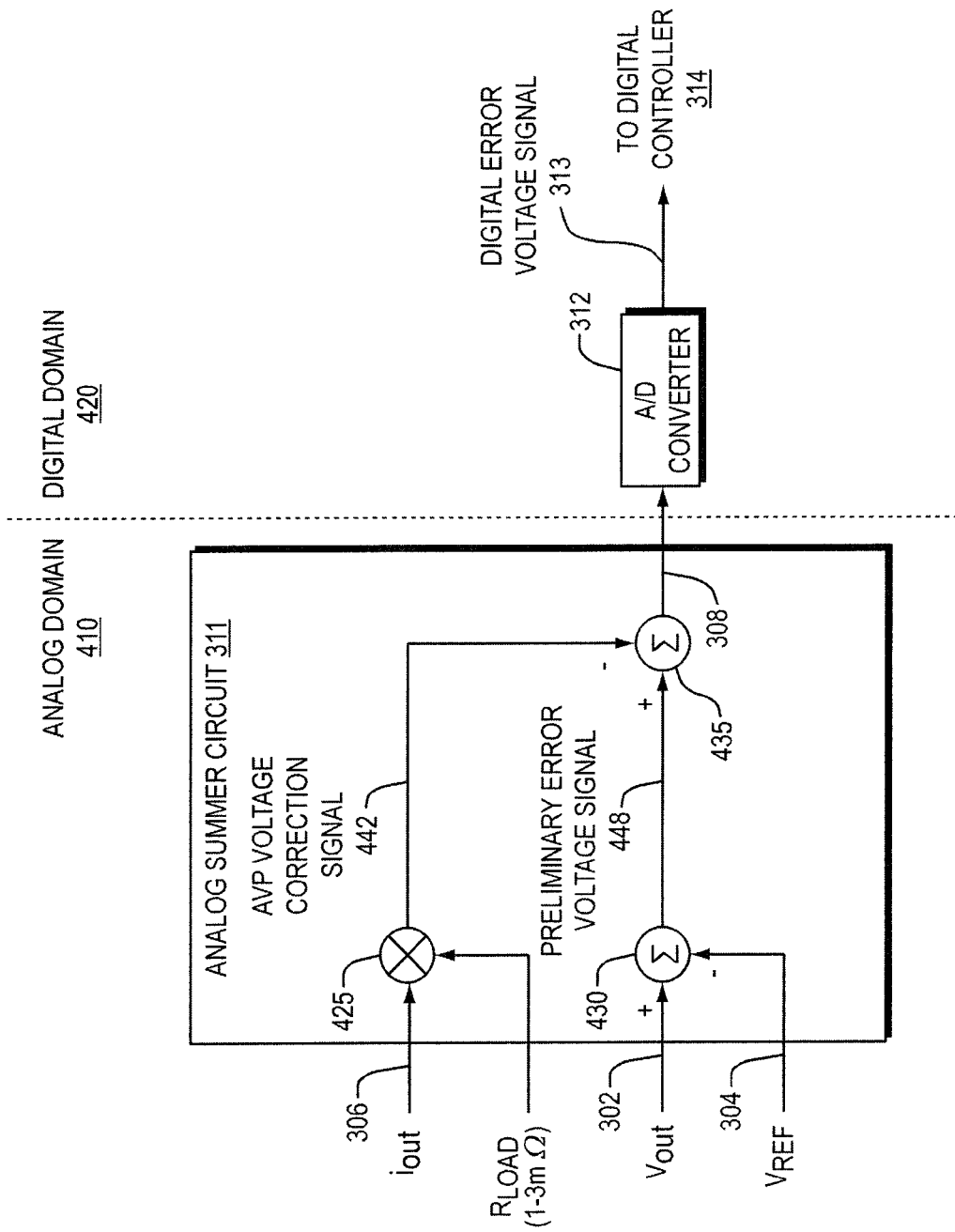
FIGS. 4A and 4B are example diagrams of circuits supporting adaptive voltage positioning according to embodiments herein.

FIG. 4A is an example diagram of an interface between an analog domain 410 and digital domain 420 supporting adaptive voltage positioning according to embodiments herein. Analog domain 410 includes analog summer circuit 311 to process the analog voltage inputs and produce an error voltage signal 308. Digital domain 420 includes analog-to-digital converter 312 and digital controller 314 to control a magnitude of the output voltage 380.

More specifically, as shown in FIG. 4A, the analog summer circuit 311 receives analog signal 302, analog reference voltage signal 304, and analog signal 306. In this more specific embodiment, the analog summer circuit 311 includes multiplier 425, summer circuit 430, and summer circuit 435. The summer module 430 is configured to generate preliminary error voltage signal 448 (e.g., an internal signal or difference signal of the analog summer circuit 311) based on a difference between the analog signal 302 and the analog reference voltage signal 304. For example, in one embodiment, the summer module 430 subtracts a magnitude of the analog reference voltage signal 304 from a magnitude of the analog signal 302 to produce error voltage signal 448.

As its name suggests, multiplier module 425 multiplies the analog signal 306 (representing an amount of current consumed by the dynamic load 308) by an impedance value (e.g., desired output impedance) of the power supply system 300 to produce a correction signal 442.

Summer module 435 receives the error voltage signal 448 and adaptive voltage positioning voltage correction signal 442 as inputs. In one embodiment, the summer module 435 produces the analog error voltage signal 308 by subtracting the (adaptive voltage positioning) voltage correction signal 442 from the error voltage signal 448. Thus, according to one embodiment, the summer module 435 adjusts the analog error voltage signal 448 by an amount of the analog correction signal 442 to produce the analog error voltage signal 308.

The configuration of the analog summer circuit 311 in FIG. 4A is shown by way of non-limiting example only. Note that the analog error voltage signal 308 can be generated based on other configurations such as (in FIG. 4B) by modifying the reference voltage 304 depending on an amount of current supplied to the dynamic load 310 and, thereafter, generating a difference voltage based on comparing the output voltage 380 with the (adaptive voltage positioning) adjusted reference voltage value.

In this latter embodiment, an output current feedback loop includes a current consumption signal (e.g., signal 306) indicating a magnitude of current consumed by the dynamic load 310. The analog summer circuit 311 can be configured to include a multiplier circuit 465 to convert the current consumption signal to an analog reference adjustment signal 482. The analog adjustment signal 482 supports adaptive voltage positioning in which an operating setpoint (e.g., adjusted reference voltage 490) changes depending on an amount of current consumed by the dynamic load 310.

The analog voltage adjustment signal 490 varies in magnitude based on an amount of current provided to the dynamic load 310 by the output voltage 380. As mentioned above, analog-to-digital converter 312 converts the analog error voltage signal 308 into digital error voltage signal 313.

Figure 4B:
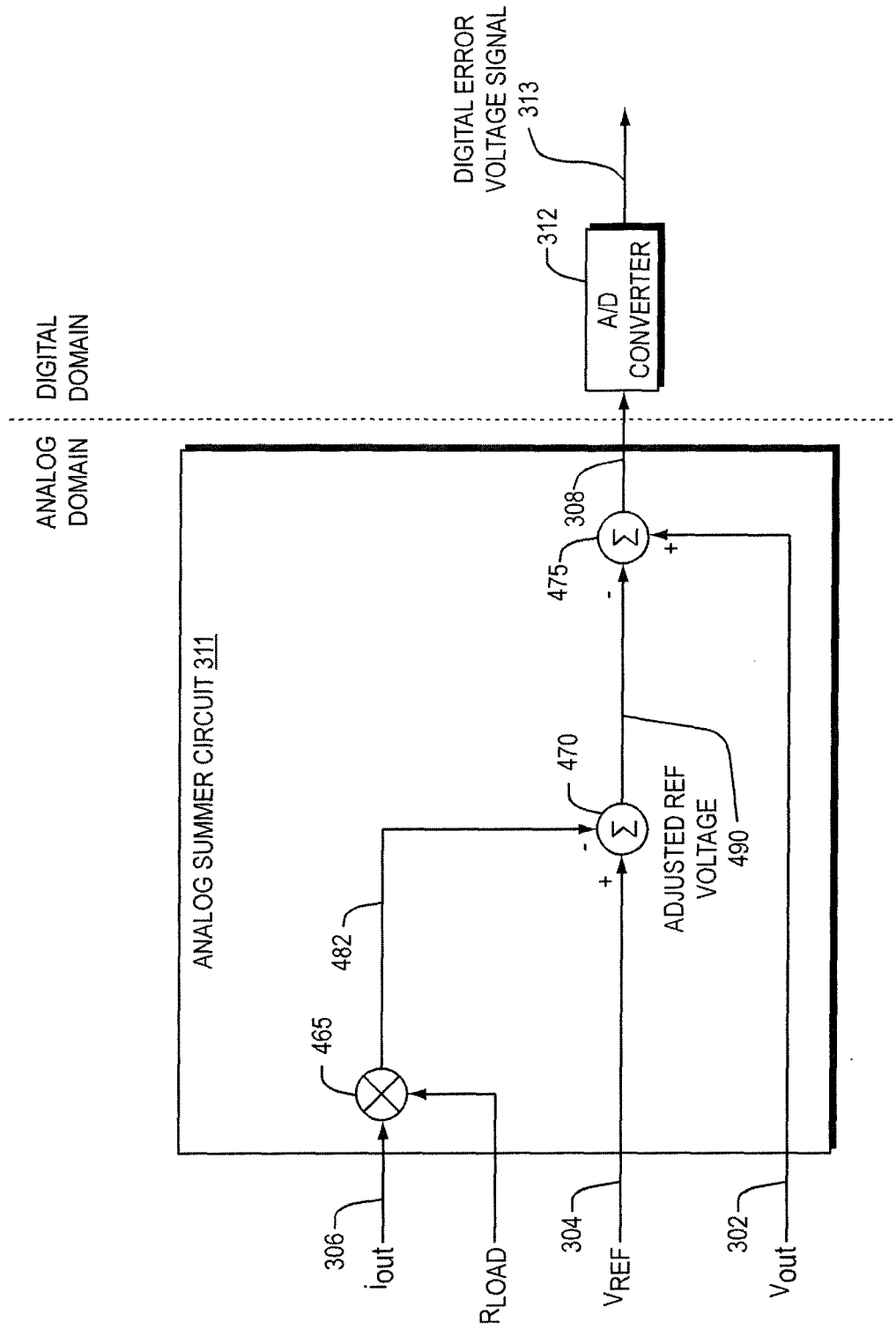

For either of the analog summer circuits shown in FIGS. 4A and 4B, during operation, the digital error voltage signal 313 generates the digital error voltage signal 313 to be a larger value during conditions in which the analog signal 302 is further from the analog reference voltage signal 304 and a smaller value during conditions in which the analog signal 302 is nearer in magnitude to the analog reference voltage signal 304. As mentioned above, the digital controller 314 utilizes the digital error voltage signal 313 to generate one or more pulse width modulation signals for driving one or more respective power supply phases to adjust the output voltage and reduce a magnitude of the digital error voltage signal.

Figure 5:
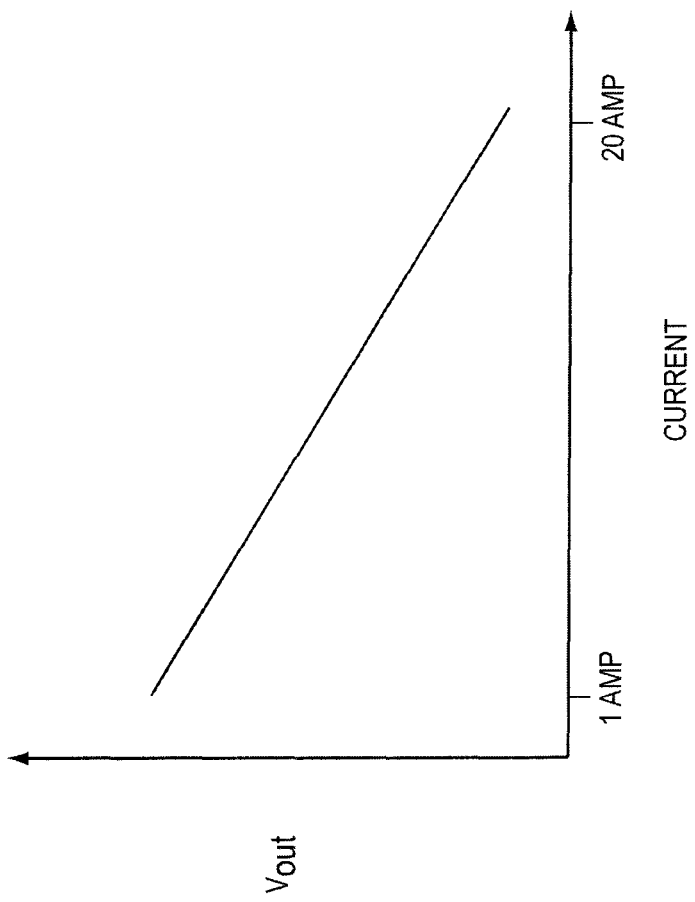
FIG. 5 is an example diagram illustrating a hypothetical, substantially linear output impedance of a power supply circuit according to embodiments herein.

FIG. 5 is a hypothetical diagram illustrating a substantially linear output impedance of a power supply circuit based on use of the analog summer circuit 311 according to embodiments herein. As shown, placement of the analog-to-digital converter 312 between the analog summer circuit 311 and the digital controller 314 as shown in FIGS. 4A and 4B enables the output of the power supply system 300 to have a corresponding substantially linear DC output impedance over a range of current values outputted by the output voltage 380 to the dynamic load 310.

Figure 6:
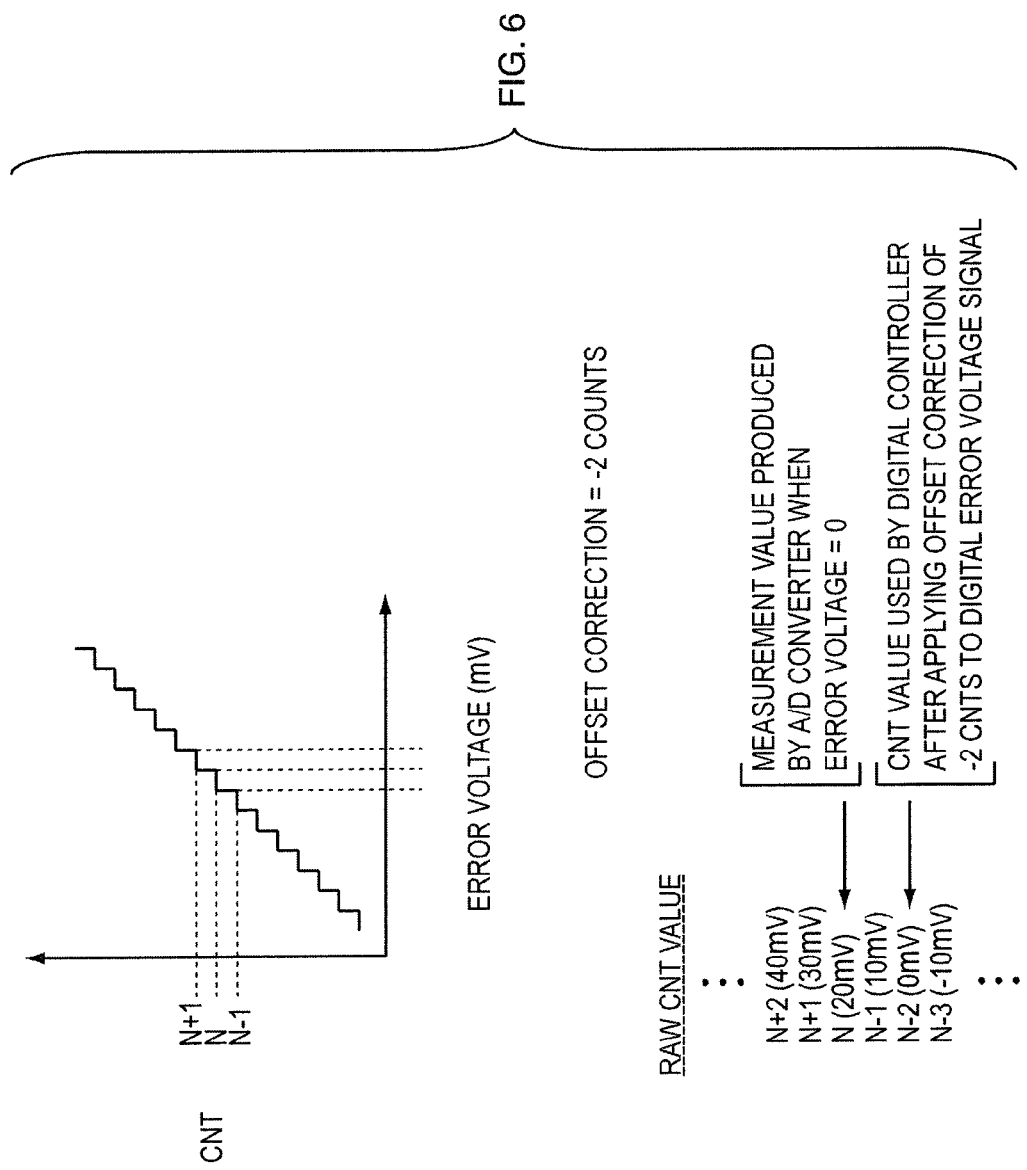
FIG. 6 is an example diagram illustrating calibration of the hybrid adaptive voltage positioning circuit according to embodiments herein.

FIG. 6 is an example diagram illustrating use and calibration of the analog-to-digital converter 312 to support adaptive voltage positioning according to embodiments herein.

As shown, a magnitude of the respective digital error voltage signal 313 generated by the analog-to-digital converter 312 is measured in counts. For example, a count value N at an intermediate position in the range of count values produced by the analog-to-digital converter corresponds to a magnitude of zero. When the analog-to-digital converter 312 generates such a value of N counts, the output voltage 380 supplied to the dynamic load 310 is equal to the appropriate for the current consumption setpoint.

When the count value generated by the analog-to-digital converter 312 is greater than or less than N counts, the digital controller 314 initiates control signals to increase or decrease the output voltage 380 to a magnitude that, in turn, will cause the digital error voltage signal 313 (as produced by the analog-to-digital converter 312) to be reduced to a count value of N again. As the current consumed by the dynamic load 310 changes, the operating setpoint (e.g., desired magnitude of output voltage 380) changes. In the manner as discussed above, the digital controller 314 constantly updates respective control signals based on the digital error voltage signal 313 to keep the magnitude of the output voltage 380 within an acceptable tolerance.

The analog summer circuit 311, analog-to-digital converter 312, and related components may be inaccurate due to component variations. In one embodiment, to account for the component variations and to provide better accuracy, the analog-to-digital converter 312 is calibrated at one or more count values in order to provide a more accurate measurement of the error voltage. In one embodiment, the analog-to-digital converter has an output count range between a minimum value and a maximum value. As described herein, count value N corresponds to an intermediate value in the output range between the minimum value and the maximum value.

In further embodiments, count N of the analog-to-digital converter 312 may correspond to a condition in which the magnitude of the analog error voltage signal 308 is zero. In other words, the count value N is a particular value in the output count value range of the analog-to-digital converter 312 that is generated during a condition in which the output voltage 380 is substantially equal to a desired operating setpoint value.

However, due to inaccuracies in the circuit, the count value N of the analog-to-digital converter 312 may correspond to a voltage value of, for example, 0.020 volts instead of zero volts. To provide error correction, embodiments herein include generating an offset value for adjusting the output of the analog-to-digital converter 312 in the range of counts. For example, the error correction can include an offset adjustment value of −2 counts that is applied to the digital error voltage signal 313 such that the digital controller 313 operates based on a more accurate reading of the received error voltage signal.

The output of the analog-to-digital converter 312 can have inaccuracies at each of multiple values in the output count range. For example, the percentage magnitude of the error may vary over the count range so that the analog-to-digital converter is non-linear. In one embodiment, error correction can include generating a single offset count value that is applied over a range of the analog-to-digital converter to provide correction even though calibration can be achieved via testing at a single count voltage value such as N. In such an embodiment, the correction can be, for example, an amount that is needed to reduce the error at the count value of the analog-to-digital converter 312 corresponding to the condition when the magnitude of the error voltage signal is zero as opposed to correcting at another count value.

In the example of FIG. 6, the digital controller 314 adds an offset correction value of −2 counts to the raw digital error voltage signal 313 produced by the analog-to-digital converter 312 in order to more accurately measure the error voltage signal and, in turn, produce an output voltage 380 that is more accurate for a given current consumption by the dynamic load 310. As mentioned above, the offset corresponding or offset adjustment value of −2 counts can be applied to the digital error voltage signal 313 over the output range of the analog-to-digital, even though calibration is done at a single count value in the output range of the analog-to-digital converter 312. In one embodiment, the offset correction or offset adjustment value reduces an error of the analog-to-digital converter 312 for at least the particular value (e.g., N counts) in the output range. The error correction value, depending on a linearity of the analog-to-digital converter counts, may provide different amounts error correction at values other than N counts due to non-linearities in the analog-to-digital converter 312. In other words, correction at the values other than the particular value of N counts may be less accurate because the applied calibration value is not performed at every count value in an output range of the analog-to-digital converter 312.

As an example, to perform calibration, a test device inputs drives analog signal 302 to be substantially equal to the reference voltage 304. A measurement is taken at the output of the analog-to-digital converter 312. The output of the analog-to-digital converter 312 should indicate an error voltage of zero volts. If the output of the analog-to-digital converter 312 does not equal zero volts during this condition, an offset value is calculated. The offset value indicates an amount by which to modify the output of the analog-to-digital converter 312 to provide correction. As discussed above, the offset value calculated for the test voltage can be applied over the range of the analog-to-digital converter 312. For example, if the offset value is calculated as −2 counts at the test value (e.g., when the output voltage is substantially equal to the reference voltage), then the adjustment value of −2 counts can be added to the output of the analog-to-digital converter 312 for each of the values over the entire range of the analog-to-digital converter 312.

Thus, embodiments herein can include calibration operations of setting a magnitude of the analog signal 302 to be substantially equal in voltage to the reference voltage 304. A nominal value can be chosen for analog signal 306 during this calibration test. While the magnitude of the analog voltage 302 is substantially equal to the reference voltage 304, the analog-to-digital converter 312 produces a given count value for the digital error voltage signal 313. The given count value can be received by calibration test equipment (or the digital controller 314). Embodiments herein can further include utilizing the test equipment (or digital controller 314) to calculate an offset value for applying to the given count value such that the offset value, when added to the given count value, produces a digital error voltage signal 313 having a magnitude of substantially zero volts. During operation of the power supply system, results of the calibration such as the calibrated offset value can be applied over a range of the analog-to-digital converter 312 to correct the digital error voltage signal 313. In other words, the given count value N (e.g., when the magnitude of the error voltage signal is zero) and other count values in the range of the analog-to-digital converter 312 (e.g., count values when the magnitude of the error voltage signal is non-zero) can be corrected during normal power supply operations such as when the power supply is actively controlling the output voltage to a desired value when driving dynamic load 310.

Figure 7:
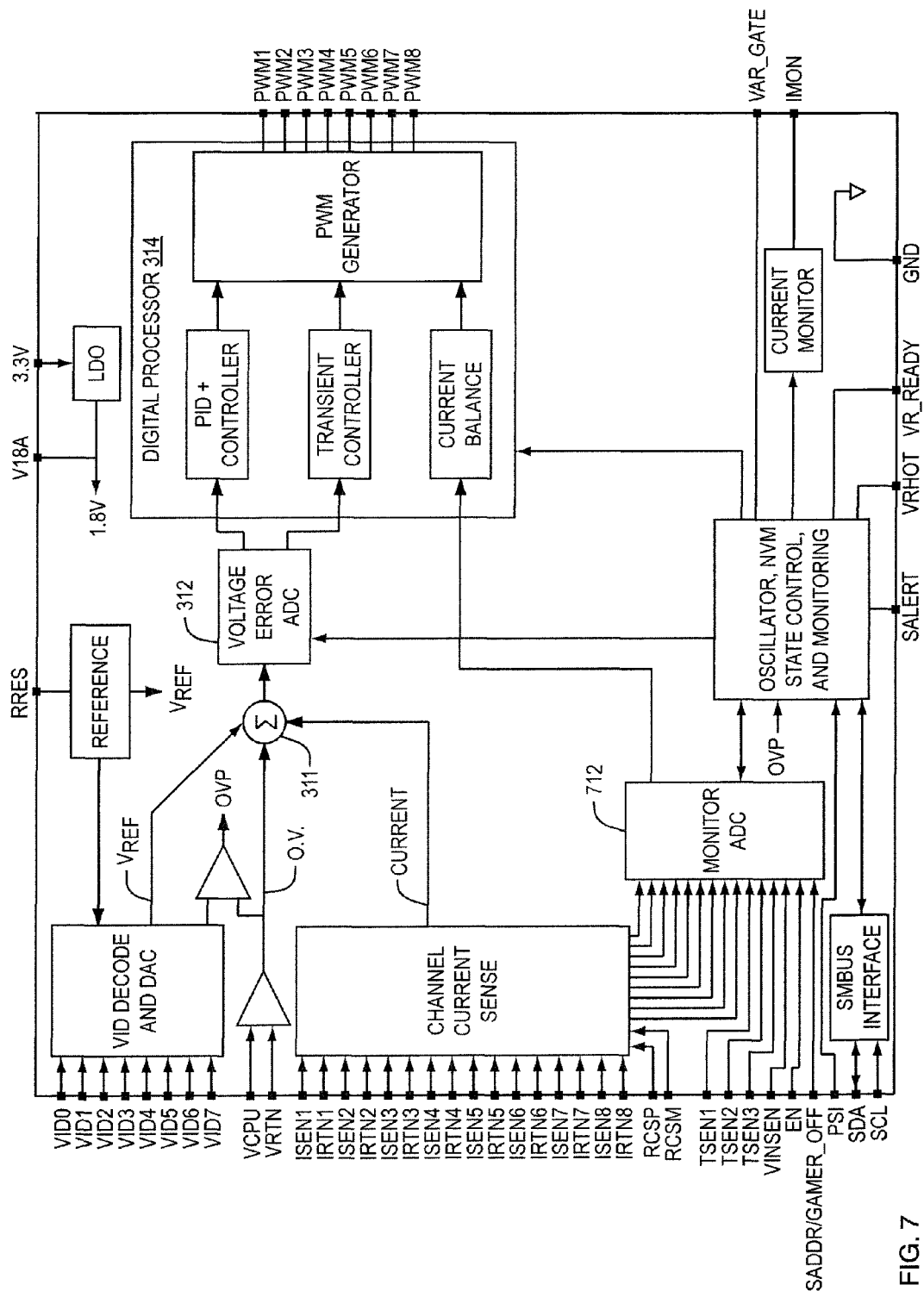
FIG. 7 is an example diagram illustrating a power supply circuit for implementing an analog/digital interface and adaptive voltage positioning according to embodiments herein.

FIG. 7 is a diagram illustrating an example power supply circuit for implementing adaptive voltage positioning in an analog/digital interface according to embodiments herein. In a manner as previously discussed, the analog summer circuit 311 produces an analog error voltage signal that is converted into a digital error voltage signal outputted to the digital controller 314. The digital controller 314, in turn, generates one or more pulse width modulation signals for driving respective phases of the power supply system 300.

Embodiments herein such as the circuit disclosed in FIG. 7 provide a cost effective way to implement digital control and monitoring functions for multiphase DC-DC voltage regulators used to power microprocessors, graphics processors, and memory in server and desktop computers. For example, according to one embodiment, this approach can use a wideband analog feedback circuit to provide the summing path for the current information required to implement active voltage positioning (AVP) together with a high-speed analog-to-digital converter 312 that convert the analog error signal (Vout (actual)−Vout(desired))−Iout*$R_{LOADLINE}$ into a high speed bitstream. Vout(actual) represents the magnitude of the output voltage 380. Vout(desired) represents the reference voltage 304. The value Iout*$R_{LOADLINE}$ represents the adaptive voltage positioning adjustment so that a magnitude of the output voltage 380 varies depending on the AVP voltage.

In one embodiment, the sample rate of the ADC is a fixed frequency and operates independently of the switching frequency of each phase. By way of a non-limiting example, the sampling can be at least 5 times the ripple frequency (switching frequency of N number of phases) and the resolution (size of an LSB in the ADC) can be less than ½ the ripple voltage which is typically 10 mV. These parameters may vary depending on the application.

Use of a high oversample rate and fine resolution enables the implementation of complex closed loop non-linear control functions which depend on accurate measurement of error voltage magnitude and respective slope (e.g., change over time).

The error digitizing ADC (e.g., analog-to-digital converter 312) can be used in conjunction with a low-power, low-speed, high-resolution (at least 8-bit) low-speed ADC (e.g., analog-to-digital converter 712) that is used to digitize the AVP voltage for the purpose of providing a digital measurement of the current supplied to the load.

Prior art includes an analog implementation of a controller, which precludes the use of complex non-linear control schemes. Other prior art uses all digital approaches in which the ADC digitizes the entire AVP voltage range. In these approaches, the ADC linearity must be very good since the regulated voltage uses a different portion of the error ADC depending on the load current. Thus the regulation accuracy depends on the linearity of the ADC. According to embodiments herein, this is not the case since the nominal setpoint is always at or around the center code of the ADC. In addition, in conventional "all" digital approaches, the AVP feedback loop must be wideband to accommodate regulation of fast repetitive loadsteps. This wideband AVP is complex to implement digitally and requires the use of two high-speed ADC channels (one can be multiplexed but the sampling rate is increased).

To supplement the analog-to-digital converter 312, embodiments herein can include a second analog-to-digital converter 712. The second analog-to-digital converter 712 can be configured to produce a signal representative of an amount of current consumed by the dynamic load 310. In one embodiment, because the analog-to-digital converter 312 is in the feedback loop, the analog-to-digital converter 312 is substantially faster than the analog-to-digital converter 712. More specifically, by way of a non-limiting example, the analog-to-digital converter 312 can be configured to operate at a speed of greater than 25 megahertz while the analog-to-digital converter 712 can be configured to operate at a speed of less than 25 megahertz. The analog-to-digital converter 312 can have a lower resolution than the analog-to-digital converter 712.

Figure 8A:
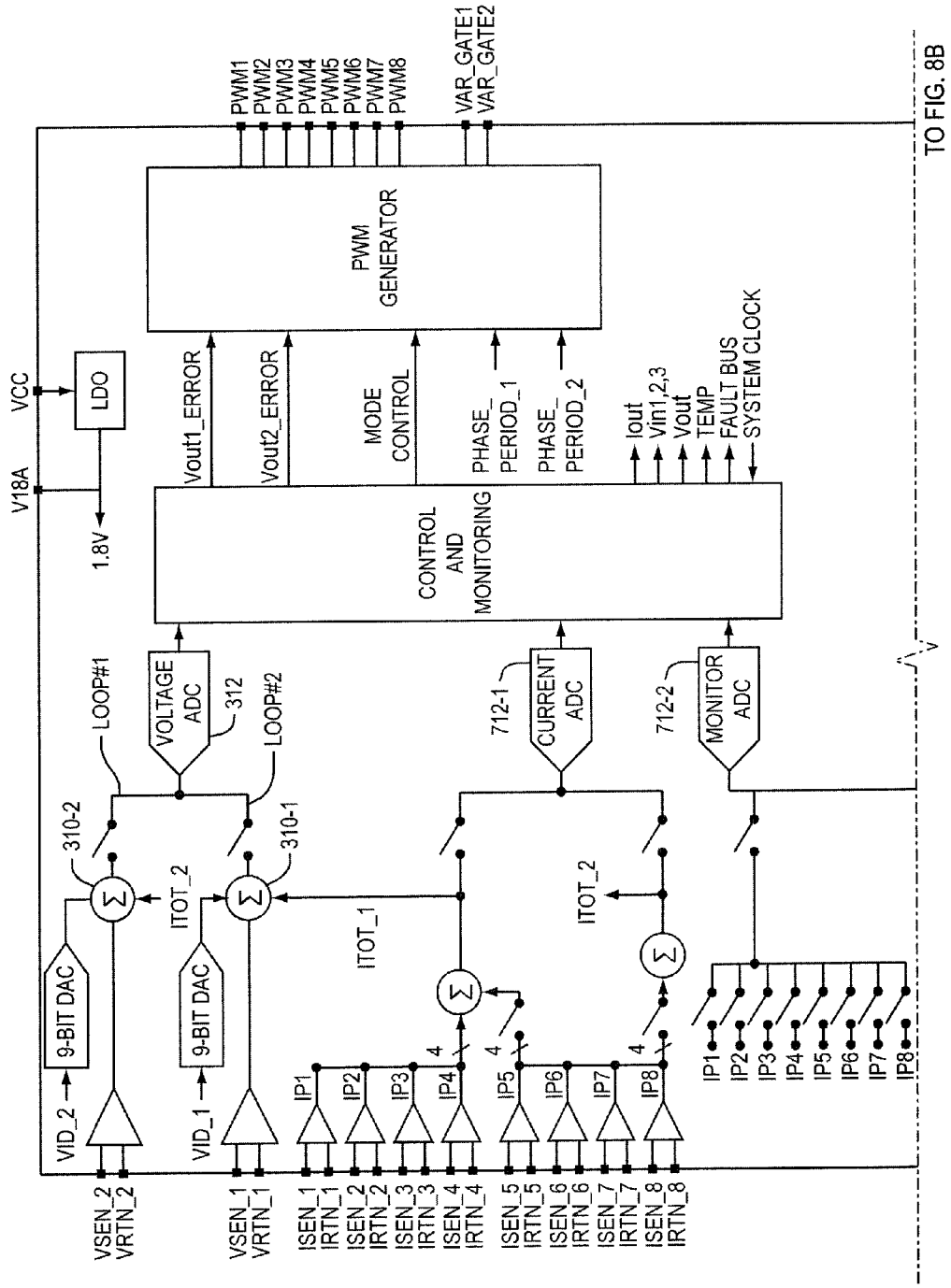
FIGS. 8A and 8B are example diagrams illustrating a power supply circuit for implementing an analog/digital interface and adaptive voltage positioning according to embodiments herein.
Figure 8B:
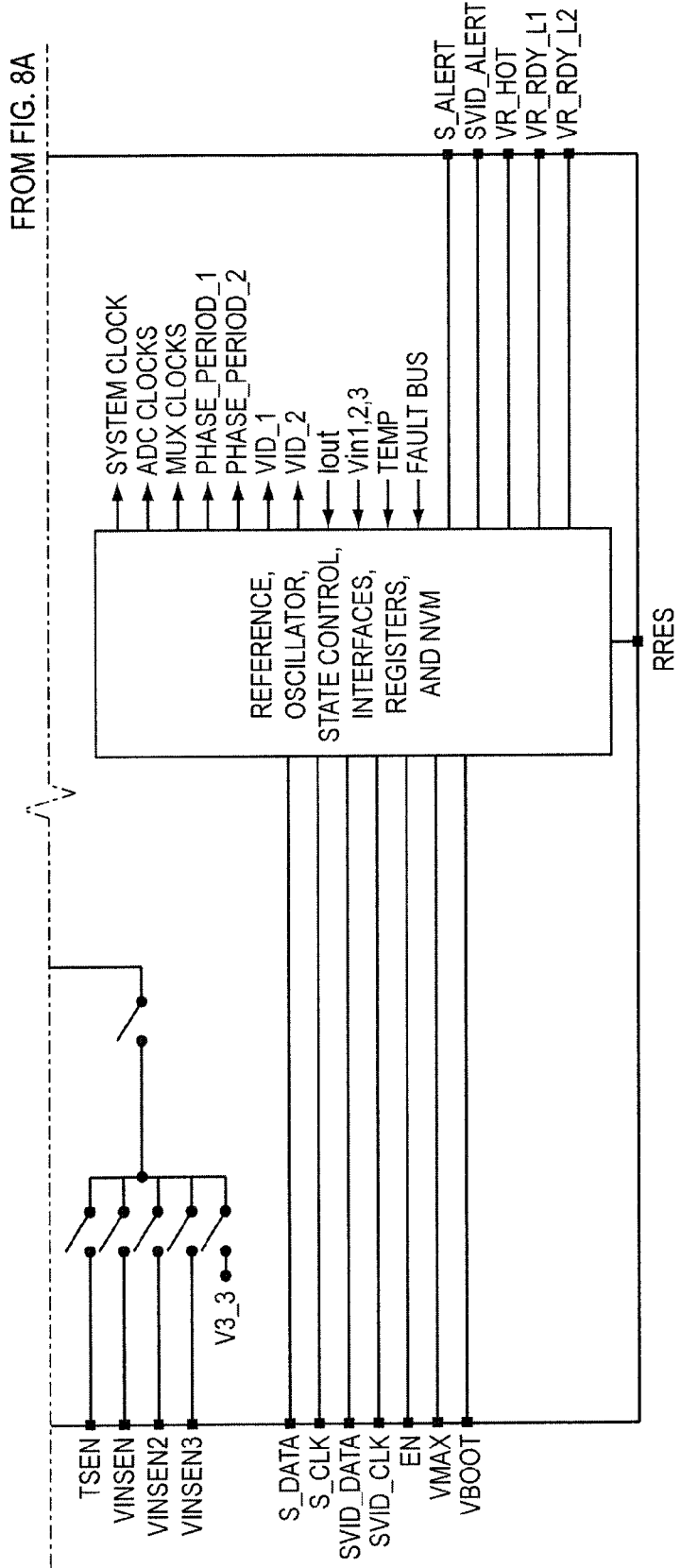

FIGS. 8A and 8B are example diagrams illustrating a power supply circuit for implementing adaptive voltage positioning in an analog/digital interface according to embodiments herein.

For the multiple voltage control loops as shown, the high-speed error digitizer according to embodiments herein can be multiplexed to digitize two or more error voltages. The digital feedback loop may require a minimal increase in complexity to support multiplexed voltage loops as digital filters can easily be reused with the addition of registers to store intermediate values. Thus, the proposed digital architecture is highly extensible.

Figure 9:
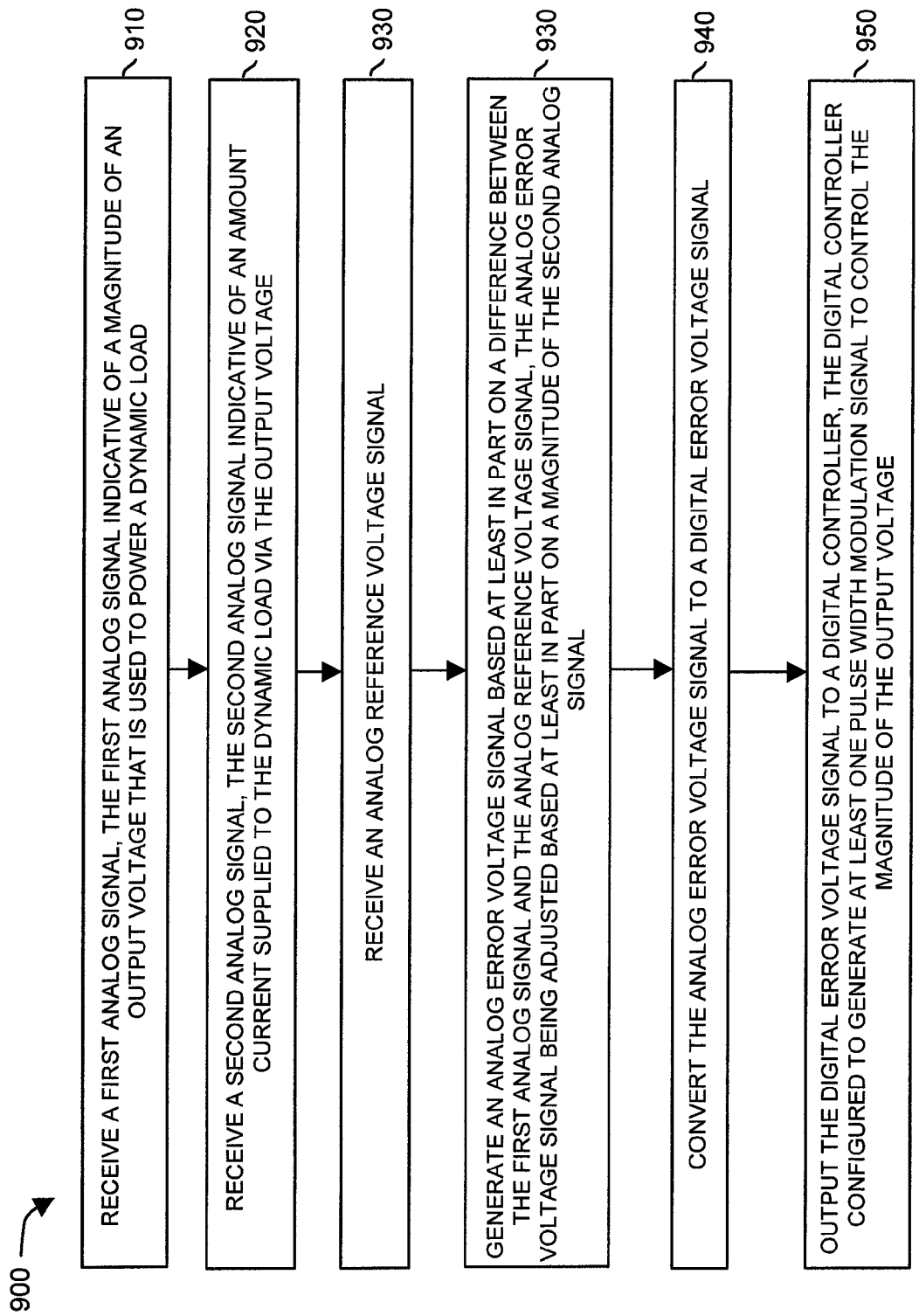
FIG. 9 is a flowchart illustrating an example method supporting adaptive voltage positioning according to embodiments herein.

FIG. 9 is a flowchart illustrating an example method of implementing adaptive voltage positioning using an analog summer circuit and analog-to-digital converter according to embodiments herein. Functionality supported by the power supply circuit as described herein and, more particularly, functionality associated with the analog summer circuit 310 (and related components such as analog-to-digital converter 312 and digital controller 314) will now be discussed via flowchart 900 in FIG. 9. Note that there will be some overlap with respect to concepts discussed above for FIGS. 1 through 8.

In step 910, the analog summer circuit 311 receives analog signal 302. The analog signal 302 is indicative of a magnitude of the output voltage 380 that is used to power a dynamic load 310.

In step 920, the analog summer circuit 311 receives analog signal 306. The analog signal 306 is indicative of an amount current supplied to the dynamic load 310 via the output voltage 380.

In step 930, the analog summer circuit 311 receives the analog reference voltage signal 304.

In step 940, the analog summer circuit 311 generates the analog error voltage signal 308 based at least in part on a difference between the analog signal 302 and the analog reference voltage signal 304. The analog error voltage signal 308 can be adjusted based at least in part on a magnitude of the analog signal 306.

In step 950, the analog-to-digital converter 312 converts the analog error voltage signal 308 to a digital error voltage signal 313.

In step 960, the analog-to-digital converter 312 outputs the digital error voltage signal 313 to digital controller 314. The digital controller 314 can be configured to generate at least one pulse width modulation signal to control one or more phases of the power supply system and, thus, the magnitude of the output voltage.

Note again that techniques herein are well suited for use in power supply circuitry and, in particular, those implementing adaptive voltage positioning techniques. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A system for producing an output voltage to power a dynamic load, the system comprising:
an output voltage feedback control loop;
an analog summer circuit in the output voltage feedback control loop, the analog summer circuit generating an analog error voltage signal based on:
   i) the output voltage received from the output voltage feedback control loop,
   ii) an analog reference voltage signal, and
   iii) an analog reference voltage adjustment signal, the analog reference voltage adjustment signal varying in magnitude based on an amount of current supplied to the dynamic load by the output voltage;
the analog error voltage signal indicative of how close a magnitude of the output voltage is to an operating setpoint, the operating setpoint being a summation of the analog reference voltage signal and the analog reference voltage adjustment signal, the operating setpoint varying depending on the amount of current supplied to the dynamic load, the analog error voltage signal being a difference between the output voltage and the operating setpoint;
an analog-to-digital converter disposed in the output voltage feedback control loop, the analog-to-digital converter converting the analog error voltage signal into a digital error voltage signal;
a digital controller, the digital controller generating a control signal based on the digital error voltage signal, the control signal driving a respective power supply switching phase of the system to produce the output voltage, the digital controller controlling the magnitude of the output voltage to reduce a magnitude of the analog error voltage to be equal to zero volts for a range of different amounts of current supplied by the output voltage to the dynamic load;
wherein the analog summer circuit receives a current consumption value indicative of the amount of current supplied to the dynamic load; and
wherein the analog summer circuit multiplies a received impedance value by the current consumption value to produce the analog reference voltage adjustment signal.

2. The system as in claim 1, wherein a magnitude of the digital error voltage signal varies within an output range of the analog-to-digital converter depending on how close the output voltage is to the operating setpoint, the digital error voltage signal being larger during conditions in which the output voltage is further from the operating setpoint and smaller during conditions in which the output voltage is nearer in magnitude to the operating setpoint;
wherein a particular value in the output range of the analog-to-digital converter corresponds to a state in which the output voltage is substantially equal to the operating setpoint, the particular value corresponding to the analog error voltage being equal to zero volts;
wherein the output range of the analog-to-digital converter is defined by a minimum value and a maximum value in the output range; and
wherein the particular value resides at an intermediate value in the output range between the minimum value and the maximum value.

3. The system as in claim 1, wherein a magnitude of the digital error voltage signal varies within an output range of the analog-to-digital converter depending on how close the output voltage is to the operating setpoint, the digital error voltage signal being larger during conditions in which the output voltage is further from the operating setpoint and smaller during conditions in which the output voltage is nearer in magnitude to the operating setpoint, the system further comprising:
an offset adjustment value to be applied to the digital error voltage signal over the output range of the analog-to-digital converter, the offset adjustment value reducing an error of the analog-to-digital converter for a particular value in the output range, the particular value corresponding to the analog error voltage being equal to zero volts.

4. The system as in claim 1 further comprising:
an output current feedback loop, the output current feedback loop conveying the current consumption value to the analog summer circuit.

5. The system as in claim 4, wherein the analog reference voltage adjustment signal supports adaptive voltage positioning in which the operating setpoint for controlling the output voltage changes depending on the amount of current supplied to the dynamic load;
wherein an increase in the amount of current to the dynamic load reduces a magnitude of the operating setpoint; and
wherein a decrease in the amount of current to the dynamic load increases a magnitude of the operating setpoint.

6. The system as in claim 1, wherein the analog-to-digital converter is a first analog-to-digital converter, the system further comprising:
a second analog-to-digital converter to produce the current consumption value representative of the amount of current supplied to the dynamic load, the second analog-to-digital converter being substantially faster than the first analog-to-digital converter.

7. The system as in claim 6, wherein the first analog-to-digital converter operates at a speed of greater than 25 megahertz and the second analog-to-digital converter operates at a speed of less than 25 megahertz.

8. The system as in claim 1, wherein a magnitude of the operating setpoint varies based on the amount of current supplied to the dynamic load by the output voltage.

9. The system as in claim 8, wherein conversion of the analog error voltage into the digital error voltage signal by the analog-to-digital converter enables the output voltage to have a corresponding substantially linear DC output impedance over the range of different amounts of current supplied to the dynamic load.

10. A method comprising:
receiving a first analog signal from a voltage feedback control loop, the first analog signal indicative of a magnitude of an output voltage that is used to power a dynamic load;
receiving a second analog signal from a current feedback control loop, the second analog signal indicative of an amount current supplied to the dynamic load via the output voltage;
receiving an analog reference voltage signal;
generating an analog error voltage signal based at least in part on a difference between the first analog signal and the analog reference voltage signal, the analog error voltage signal being adjusted based at least in part on a magnitude of the second analog signal;
utilizing an analog to digital circuit to receive the analog error voltage signal and convert the analog error voltage signal to a digital error voltage signal, a particular digital code of the analog to digital circuit corresponding to a condition in which the analog error voltage signal is zero;

outputting the digital error voltage signal to a digital controller, the digital controller configured to use the digital error voltage signal to generate at least one pulse width modulation signal to control the magnitude of the output voltage within an acceptable tolerance;

wherein generating the analog error voltage signal includes:

generating an internal analog error voltage signal based on a difference between the first analog signal and the analog reference voltage signal;

receiving an impedance value;

multiplying the second analog signal by the impedance value to produce an analog correction signal; and adjusting the internal analog error voltage signal by an amount of the analog correction signal to produce the analog error voltage signal.

11. The method as in claim 10, wherein generating the analog error voltage signal based on the difference between the first analog signal and the analog reference voltage signal comprises:

generating the digital error voltage signal to be a larger value during conditions in which the first analog signal is further from the analog reference signal and a smaller value during conditions in which the first analog signal is nearer in magnitude to the analog reference signal.

12. The method as in claim 10, wherein generating the analog error voltage signal based on the difference between the first analog signal and the analog reference voltage signal comprises:

subtracting a magnitude of the analog reference voltage signal from a magnitude of the first analog signal.

13. The method as in claim 10, wherein outputting the digital error voltage signal enables the digital controller to generate the at least one pulse width modulation signal to adjust the output voltage to reduce a magnitude of the digital error voltage signal.

14. The method as in claim 10, wherein a magnitude of the second analog signal varies depending on an amount of current consumed by the dynamic load; and wherein the second analog signal enables the output voltage to be controlled via adaptive voltage positioning.

15. The method as in claim 10 further comprising:

setting a magnitude of the first analog voltage to be substantially equal to the reference voltage;

while the magnitude of the first analog voltage is substantially equal to the reference voltage, receiving a given count value associated with the digital error voltage signal;

calculating an offset value for applying to the given count value, the offset value when added to the given count value producing a digital error voltage signal having a magnitude of substantially zero volts; and applying the offset value over a range of an analog-to-digital converter producing the digital error voltage signal, the range including the given count value and multiple other count values outputted by the analog-to-digital converter.

16. The system as in claim 10, wherein conversion of the analog error voltage into the digital error voltage signal enables the output voltage to have a corresponding substantially linear DC output impedance over a range of current outputted by the output voltage to the dynamic load.

17. The system as in claim 4, wherein the system is a power supply system; and wherein the analog summer circuit substantially linearizes a DC output impedance of the power supply system over the range of current outputted by the power supply system to the dynamic load.

18. The system as in claim 9 further comprising:

an output current feedback loop, the output current feedback loop conveying the current consumption value indicating a magnitude of current consumed by the dynamic load with respect to the output voltage.

19. The system as in claim 18, wherein the analog reference voltage adjustment signal varies in magnitude based on the amount of current supplied to the dynamic load; and wherein the analog-to-digital converter is a first analog-to-digital converter, the system further comprising:

a second analog-to-digital converter to produce the current consumption value indicative of the amount of current consumed by the dynamic load, the second analog-to-digital converter being substantially faster than the first analog-to-digital converter, the first analog-to-digital converter operating at a speed of greater than 25 megahertz and the second analog-to-digital converter operating at a speed of less than 25 megahertz.

20. The method as in claim 10, wherein a magnitude of the analog error voltage signal equals the first analog signal minus the analog reference voltage signal minus the analog adjustment value.

21. The method as in claim 20, wherein a magnitude of the analog reference voltage adjustment value varies depending on the amount of current supplied to the dynamic load via the output voltage, the digital controller controlling the magnitude of the output voltage to reduce the digital error voltage to be equal to the particular digital code over a range of different amounts of current supplied to the dynamic load, the particular digital code corresponding to an analog error voltage signal of zero volts.

22. The system as in claim 1, wherein the analog summer circuit produces a magnitude of the analog error voltage signal to equal the magnitude of the output voltage minus a magnitude of the analog reference voltage signal minus the analog reference voltage adjustment signal.

23. The system as in claim 22, wherein zero volts corresponds to a particular digital code in the analog-to-digital converter, the digital controller controlling the magnitude of the output voltage to reduce the digital error voltage to be equal to the particular digital code over the range of different amounts of current supplied to the dynamic load.

24. The system as in claim 18, wherein a magnitude of the operating setpoint decreases as the amount of current consumed by the dynamic load increases; and wherein the magnitude of the operating setpoint increases as the amount of current consumed by the dynamic load decreases.

25. The system as in claim 1, wherein a magnitude of the analog error voltage signal equals the magnitude of the output voltage minus a magnitude of the analog reference voltage signal plus a magnitude of the analog reference voltage adjustment value;

wherein the system is a power supply; and wherein the impedance value represents an output impedance of the power supply.

26. The method as in claim 25, wherein the digital controller controls the magnitude of the output voltage to reduce the digital error voltage to be equal to a particular digital code over a range of different amounts of current supplied to the dynamic load, the particular digital code corresponding to an analog error voltage signal of zero volts.

27. The system as in claim 1, wherein the magnitude of the operating setpoint is nearer in magnitude to a magnitude of the analog reference voltage signal for low current supplied to the dynamic load as compared to high current supplied to the dynamic load during which the difference between the magnitude of the operating setpoint and the analog reference is greater.

\* \* \* \* \*